UNITED STATES PATENT OFFICE.

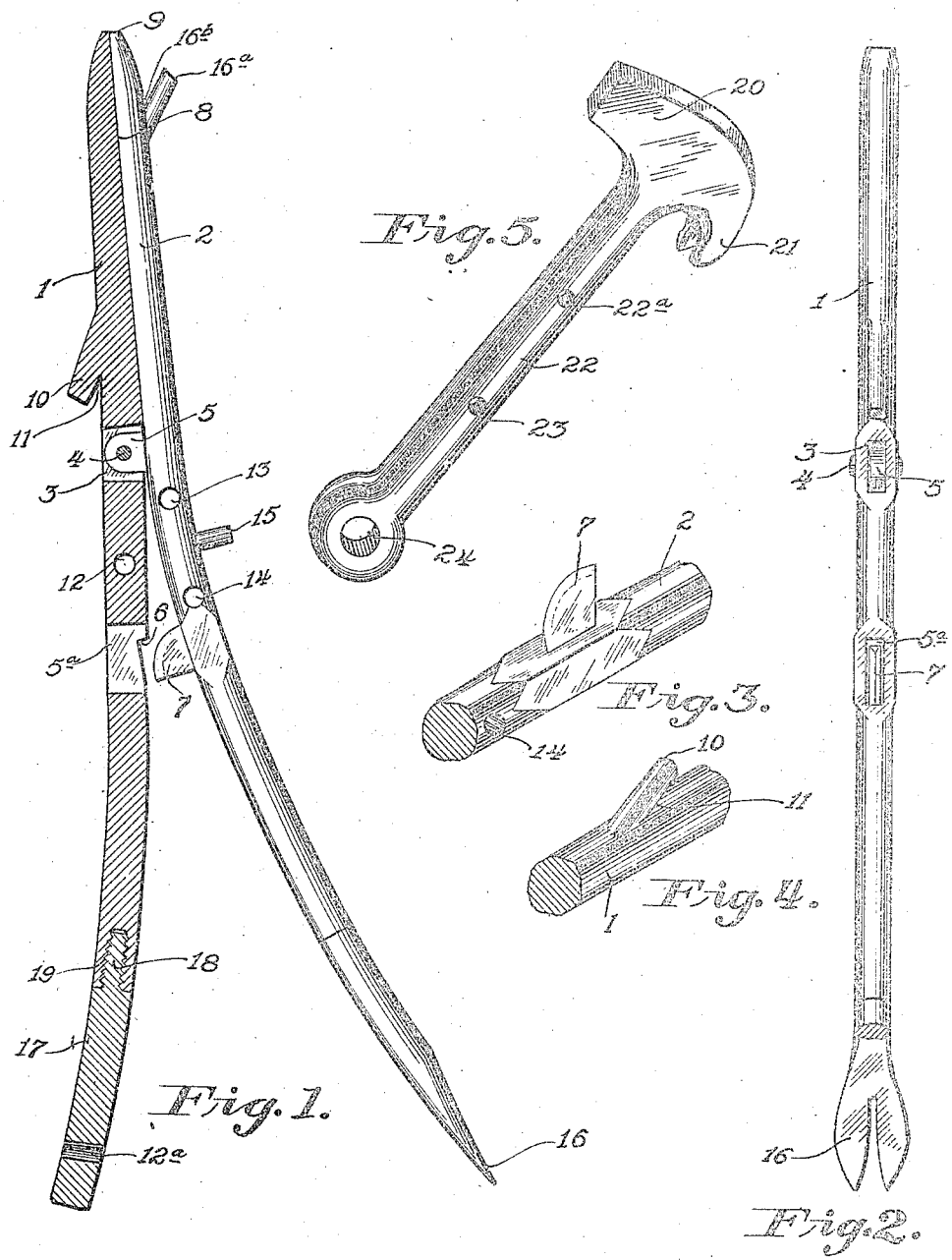

JOHNNIE C. DIKES, OF BROWNWOOD, TEXAS.

COMBINATION-TOOL.

963,124.　　　　Specification of Letters Patent.　　Patented July 5, 1910.

Application filed May 29, 1909. Serial No. 499,207.

*To all whom it may concern:*

Be it known that I, JOHNNIE C. DIKES, a citizen of the United States, residing at Brownwood, in the county of Brown and State of Texas, have invented certain new and useful Improvements in Combination-Tools, of which the following is a specification, reference being had therein to the accompanying drawing.

This invention relates to fence tools, especially adapted for use in connection with wire fences, and the principal object of the invention is to provide a tool by means of which the wires of the fence may be stretched, tightened, spliced, mended, fastened to stays, twisted together, and held while being otherwise attended to.

In carrying out the objects of the invention generally stated above it will, of course, be understood that the essential features of the same are susceptible of changes in details and structural arrangements, one preferred and practical embodiment of which is shown in the accompanying drawings, wherein—

Figure 1 is a plan view of the improved fence tool, one member thereof being shown in longitudinal section. Fig. 2 is a bottom plan view of the same, one end of one of the members of the tool being broken away to show the end of the other member. Fig. 3 is a detail perspective view of a portion of one of the members of the tool, showing a cutting blade projecting laterally therefrom. Fig. 4 is a similar view of a portion of the other member showing the same equipped with a wire holding prong. Fig. 5 is a perspective view of an auxiliary tool for use in connection with one of the members of the fence tool.

Referring to said drawings by numerals, 1 and 2 designate the two members of the tool, said members each being composed of a steel bar or rod, one of their end portions being straight and their other ends being outwardly curved. One of said members (1) is provided with a transverse opening 3 formed in its straight portion and in which is mounted a pivot pin 4 upon which a pivot ear 5 projecting laterally from the member 2 is mounted. Said member 1 is provided with a second recess immediately adjacent the inner portion of its curved end, said second recess being designated by the numeral 5ª and extending transversely through said member and having the inner ends of its side walls notched as at 6 to form a seat for a wire strand. A cutting blade 7 projects laterally from the member 2 and when said members are brought together, said blade will pass through said recess 5ª and cut a wire strand on the seat 6, as will be readily understood.

It will be obvious that the curved ends of the members form the handles, and the straight ends form the gripping jaws, the meeting faces of said jaws being preferably flat as indicated at 8, and preferably their extreme ends taper so that when in a closed position as shown in Fig. 1, the tool will have a pointed end 9, for a purpose to be explained.

The member 1 of the tool is provided with an outwardly projecting rearwardly inclined lug 10 which forms between itself and the rear face of the gripping jaw of the member 1 a holding notch 11 for the wire strands. The member 1 is also provided with two transverse openings 12—12ª, the opening 12 being located between its hinge recess and the cutting blade recess, and the opening 12ª being located adjacent the outer end of the handle.

The member 2 is provided with two transversely extending openings 13 and 14 which are located between the hinge connection with the member 1 and the cutting blade, and at its rear, and between said openings, it is provided with a laterally extending outwardly projecting lug or pin 15 forming a guide for a wire which is being tied or twisted by the tool, as will be presently explained. Said member 2 has the outer end of its handle in the form of a claw 16 which is especially adapted for pulling staples, nails, &c. Said claw-end of the handle being preferably separable from the handle by means of its threaded engagement therewith as will be explained in connection with the handle of the other member. The forward end portion of said member 2 carries an outwardly projecting forwardly inclined lug 16ª forming a notch 16ᵇ between itself and the member 2 which serves to hold wire strands, as will be obvious.

The rear end of the member 1 has its handle in the form of a section 17 from which projects a reduced threaded extension 18 adapted for detachable engagement with a threaded longitudinal recess 19 formed in said end of the member 1. The claw-end of the other member 2 is of the same type, hence it has not been thought necessary to illustrate the same in section. The members 1 and 2 are provided with the detachable sections so as to increase their leverage when used in connection with heavy work.

In Fig. 5 an auxiliary tool has been shown which is in the form of a hammer, the head 20 of the same being used for driving staples, nails, &c., and its claw 21 being used for extracting the same. The handle 22 is provided with regularly spaced apart transversely arranged intermediate openings 22$^a$—23 through which wire strands may be passed, and the free end of the handle is provided with an eye 24 by means of which the auxiliary tool may be mounted on the end of the member 1 of the fence tool. The lugs 10 or 16$^a$ of the members 1 and 2 are used for holding the wire strand while the said strand is being tightened by turning the tool to wind the wire about the tapering end 9, which operation also straightens the wire. The intermediate openings 12, 13, 14 are used for receiving opposite ends of wires so that when the tool is turned bodily, or lengthwise, the wires will be twisted together. The end opening in the member 1 is for use in connection with splicing in a mending wire, in which instance, the mending wire is first attached to a broken wire, and its free end passed through said opening, the tool is then turned over or rotated to cause the handle 16 to act as a lever, wind the mending wire about the end of member 1, bringing the broken ends together and then tied to the broken wire.

The auxiliary tool shown in Fig. 5 may be used separate from the main tool to perform its staple pulling or driving functions, and also by means of its openings in the handle may be used for twisting wires together. It is intended primarily however, to be used in connection with the main tool, and is supported on the end of the member 1 by means of its end eye, and is especially adapted for coöperating with the prongs and notches of said members so that the work may be held while incidental matters in connection with fence building are being attended to.

In addition to the foregoing, it will be seen that the improved tool is of especial value for use in attaching the wires to stays or posts. To perform this function, the ends of the wires may be passed through the openings of the member 2 and over the lug projecting therefrom, and by bodily turning the tool using the post or stay as a fulcrum, if desired, it will be seen that the said wires will be tightly twisted about the post or stay.

What I claim as my invention is:—

A tool of the character described, comprising hinged members having clamping jaws, said jaws tapering to a point, reversely-inclined projections one on each of said members, each of said projections forming a notch, and one of said projections being located adjacent to the end of one of the jaws and the other projection being located adjacent to the hinged portion of said members.

In testimony whereof I hereunto affix my signature in presence of two witnesses.

JOHNNIE C. DIKES.

Witnesses:
E. J. MILLER,
JAS. W. WAYMAN.